United States Patent
Utsumi

(10) Patent No.: US 6,721,655 B1
(45) Date of Patent: Apr. 13, 2004

(54) VEHICLE TRAVEL GUIDE DEVICE AND VEHICLE TRAVEL GUIDE METHOD

(75) Inventor: Koichiro Utsumi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/258,846

(22) PCT Filed: Mar. 14, 2001

(86) PCT No.: PCT/JP01/02019
§ 371 (c)(1),
(2), (4) Date: Oct. 29, 2002

(87) PCT Pub. No.: WO02/073133
PCT Pub. Date: Sep. 19, 2002

(51) Int. Cl.[7] ............................................. G01C 21/30
(52) U.S. Cl. .................. 701/210; 701/207; 701/208; 701/211; 340/995.1; 340/995.15; 340/995.19
(58) Field of Search .......................... 701/23, 25, 26, 701/200, 201, 207, 208, 209, 210, 211, 212, 214, 300; 340/995.1, 995.11, 995.15, 995.17, 995.19, 995.21

(56) References Cited

U.S. PATENT DOCUMENTS 5,731,979 A * 3/1998 Yano et al. .................. 701/211
6,202,026 B1 * 3/2001 Nimura et al. ............... 701/211
6,445,999 B1 * 9/2002 Nakamura .................... 701/208

FOREIGN PATENT DOCUMENTS

| JP | 05-018773 A | 1/1993 |
|----|-------------|--------|
| JP | 07-083685 A | 3/1995 |
| JP | 07-129888 A | 5/1995 |
| JP | 8-23919 B2  | 3/1996 |
| JP | 08-122088 A | 5/1996 |
| JP | 10-300504 A | 11/1998 |
| JP | 10-318768 A | 12/1998 |
| JP | 11-037784 A | 2/1999 |

* cited by examiner

Primary Examiner—Gertrude A. Jeanglaude
(74) Attorney, Agent, or Firm—Birch, Stewart, Kolasch & Birch, LLP

(57) ABSTRACT

In accordance with operation, data on a starting point, a destination, and a display scale are inputted to set a first route from the starting point to the destination based on the inputted data on the starting point and the destination. In case an obstacle which blocks a smooth traveling of the vehicle is detected in the first route, a second route to bypass the obstacle is searched for. In accordance with the inputted display scale, the range of display of the map information to be displayed is set. With the traveling of the vehicle, the map information to be displayed in the range of display is successively updated. In case the searched for second route is to be displayed, the new range of display is set irrespective of the inputted display scale so that the overall second route is displayed simultaneously with the first route.

12 Claims, 5 Drawing Sheets

VEHICLE TRAVEL GUIDE DEVICE AND VEHICLE TRAVEL GUIDE METHOD

This application is the national phase under 35 U.S.C. §371 of PCT International Application No. PCT/JP01/02019 which has an International filing date of Mar. 14, 2001, which designated the United States of America.

TECHNICAL FIELD

This invention relates to a navigation device for a vehicle and a method of navigating a vehicle for navigating a route.

BACKGROUND ART

In the conventional navigation device for a vehicle and a method of navigating a vehicle for navigating a route, a destination and the desired display scale are inputted from an operating part. Then, the optimum route is searched for from map data stored in a memory, or the like. With the current position as a starting point, a map containing therein the route searched for within a range corresponding to the inputted display scale is displayed on a display device. Further, the current position of the traveling vehicle is detected by a global positioning system (GPS) receiver, and the route of the vehicle is navigated by successively changing the range of display with the traveling speed.

Among the conventional navigation device for a vehicle and methods of navigating a vehicle, there is a device as follows. Namely, the traffic information on the route searched for by a vehicle information and communication system (VICS) receiver is detected and, where a traffic snarl, a traffic accident, or the like, has occurred in the searched route, a bypass route is searched for. And a message is displayed to notify the occurrence of the traffic snarl, the traffic accident, or the like, in the traveling route, and the display is then switched to the bypass route. Thereafter, a message is displayed to ask a user of the vehicle whether the bypass route will be taken or not.

However, in this kind of navigation device for a vehicle and a method of navigating a vehicle, the traveling route and the bypass route are displayed by switching from one to the other. Therefore, the user is at a loss whether the bypass route should be taken or not.

As a solution to the above-described drawback, among the conventional navigation device for a vehicle and methods of navigating a vehicle, there is a device which divides the display screen into two so as to simultaneously display the traveling route and the bypass route on a display scale that is set by the user.

However, in this kind of navigation device for a vehicle and the method of navigating a vehicle, the display scale that is set by the user ordinarily covers a relatively narrow range that can be seen with eyes. Therefore, the bypass route displayed on the same display scale as the above-described display scale is too narrow to be easily recognized. As a result, it is required for the user to change the display scale of the bypass route.

In any one of the above-described conventional devices, in order for the user to recognize the bypass route accurately, the user is forced to steadily gazing the display screen, which may momentary loose user's attention to the driving operation. In particular, in a place like an intersection, or the like, where a special care must be paid to the driving operation, steadily gazing the display screen attends with great danger.

This invention has been made to solve the above and other problems and an object thereof is to provide a navigation device for a vehicle and a method of navigating a vehicle which, in case a bypass route is to be displayed due to the occurrence of a traffic snarl, a traffic accident, or the like, in the route along which the vehicle is traveling at present, the traveling route and a bypass route can be easily and accurately recognized without changing a display scale.

Further, another object of the present invention it to provide a navigation device for a vehicle and a method of navigating a vehicle which, in the case of a user is unfamiliar with the place where the utmost attention must be paid to the driving operation or with the driving operation, does not cause the user uneasiness for processing in connection with the selection of the traveling route and the bypass route.

DISCLOSURE OF INVENTION

A navigation device for a vehicle according to the present invention includes operating means for inputting therefrom data on a destination and a display scale in accordance with operation; position detecting means for detecting a current position of a vehicle; route setting means for setting a first route from the current position to the destination based on data on the destination inputted by the operating means and the current position detected by the position detecting means; bypass route searching means for searching for a second route to bypass an obstacle when the obstacle which blocks a smooth traveling of the vehicle is detected in the first route; and display control means which sets the range of display of map information to be displayed on a predetermined display device in accordance with the display scale inputted by the operating means so as to successively update the map information to be displayed within the range of display with the traveling of the vehicle, the display control means also displaying the overall second route simultaneously with the first route by setting a new range of display irrespective of the inputted display scale when the second route searched by the bypass route searching means is displayed.

Through this arrangement, when a bypass route is displayed on the route along which the vehicle is traveling at present due to the occurrence of a traffic snarl, a traffic accident, or the like, the present route and the bypass route can be easily and accurately recognized without changing the display scale.

A method of navigating a vehicle according to the present invention includes the steps of: inputting data on a destination and a display scale in accordance with an operation; detecting a current position of the vehicle; setting a first route from the current position to the destination based on data on the inputted destination and the detected current position; searching for a second route to bypass an obstacle when the obstacle which blocks a smooth traveling of the vehicle is detected in the first route; and setting the range of display of map information to be displayed on a predetermined display device in accordance with the inputted display scale so as to successively update the map information to be displayed within the range of display with the traveling of the vehicle, and setting the overall second route irrespective of the inputted display scale when the searched for second route so as to display the overall first route simultaneously with the second route.

Through this arrangement, when a bypass route is displayed on the route along which the vehicle is traveling at present due to the occurrence of a traffic snarl, a traffic accident, or the like, the present route and the bypass route can be easily and accurately recognized without changing the display scale.

BEST MODE FOR CARRYING OUT THE INVENTION

In order to describe this invention in more detail, the best mode for carrying out the present invention will be described with reference to the accompanying drawings.

FIRST EMBODIMENT

Figure 1:
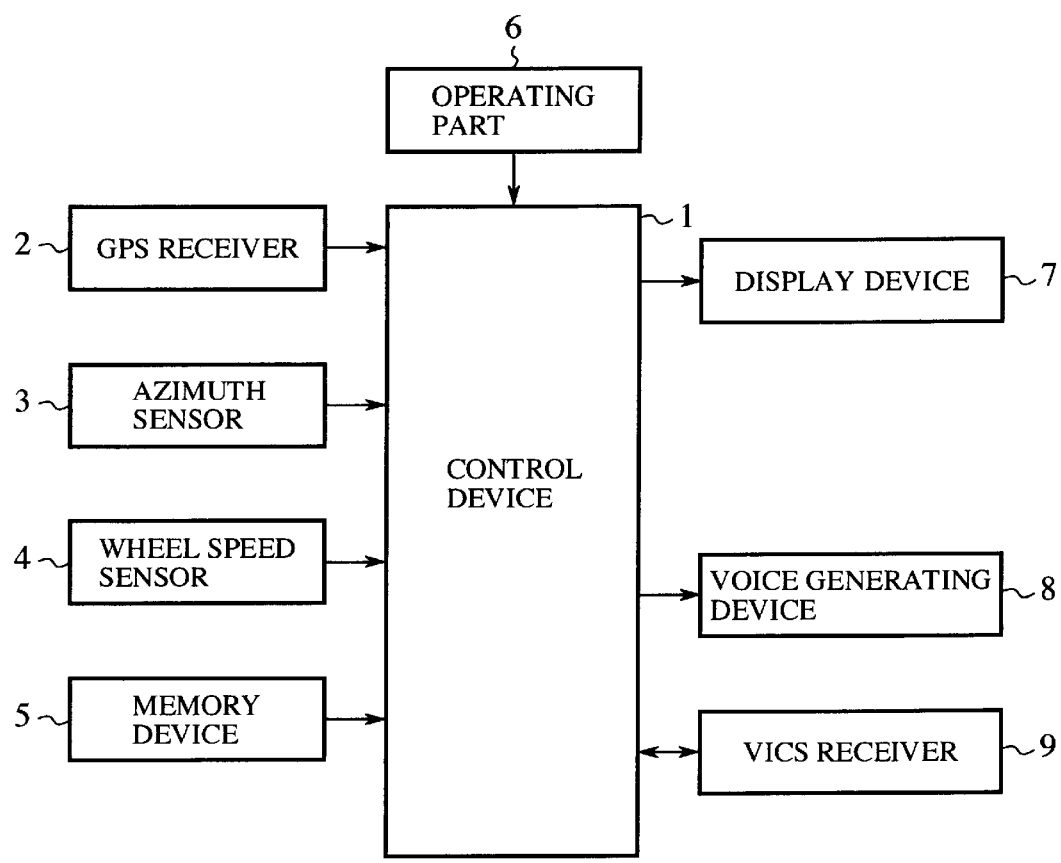
FIG. 1 is a block diagram showing an arrangement of a navigation device for a vehicle according to a first embodiment of the present invention.

FIG. 1 is a block diagram showing an arrangement of navigation device for a vehicle according to the first embodiment of the present invention.

Referring to FIG. 1, reference numeral 1 denotes a control device (route setting means, bypass route searching means, display control means, calculating means), reference numeral 2 a global positioning system (GPS) receiver (position detecting means), reference numeral 3 an azimuth sensor, reference numeral 4 a wheel speed sensor, reference numeral 5 a memory device, reference numeral 6 an operating part (operating means), reference numeral 7 a display device, reference numeral 8 a voice generating device, and reference numeral 9 a vehicle information and communication system (VICS) receiver.

The operation of the navigation device for a vehicle of the first embodiment will be described.

The GPS receiver 2 detects the current position of the vehicle by a radio wave from satellites and inputs it to the control device 1. The azimuth sensor 3 detects the running direction of the wheels relative to the latitude and the longitude by taking advantage of the terrestrial magnetism, or the like, and inputs it to the control device 1. The wheel speed sensor 4 detects the distance covered of the vehicle by the number of revolutions of the wheels, and inputs it to the control device 1. The memory device 5 is provided with a memory medium such as a compact disc read only memory (CD-ROM), or the like, in which map data and voice data are stored for navigation. In response to a read command from the control device 1, the memory device 5 reads such data and inputs them to the control device 1. In the map data, each of the roads is divided into a plurality of nodes by intersections, and the space between each of the nodes is defined as a link. The map is made up by connecting the links. Further, the map is formed into a hierarchical structure and is constituted by lower maps which are detailed maps covering relatively narrow ranges and upper maps covering relatively wider ranges including a plurality of lower maps.

The operating part 6 is constituted by a wireless remote controller, or the like, and inputs to the control device 1, e.g., the destination and a display scale of the map to be displayed in accordance with the operation by the user. The display device 7 displays the images such as a map, a mark of running direction, a mark of vehicle position, or the like, depending on the image data to be outputted from the control device 1 with the vehicle while updating them, and displays letters of messages, icon switches, or the like, which prompt the user to select the route at need. The voice generating device 8 outputs, by means of a voice, the message, or the like, which prompt the user to select the route based on the voice data to be outputted from the control device 1. The VICS receiver 9 receives the road traffic information and inputs it to the control device 1.

The control device 1 is configured by a microcomputer, a ROM having stored therein a control program, initial data, or the like, for guidance, and a random access memory (RAM) as a work area.

Figure 2:
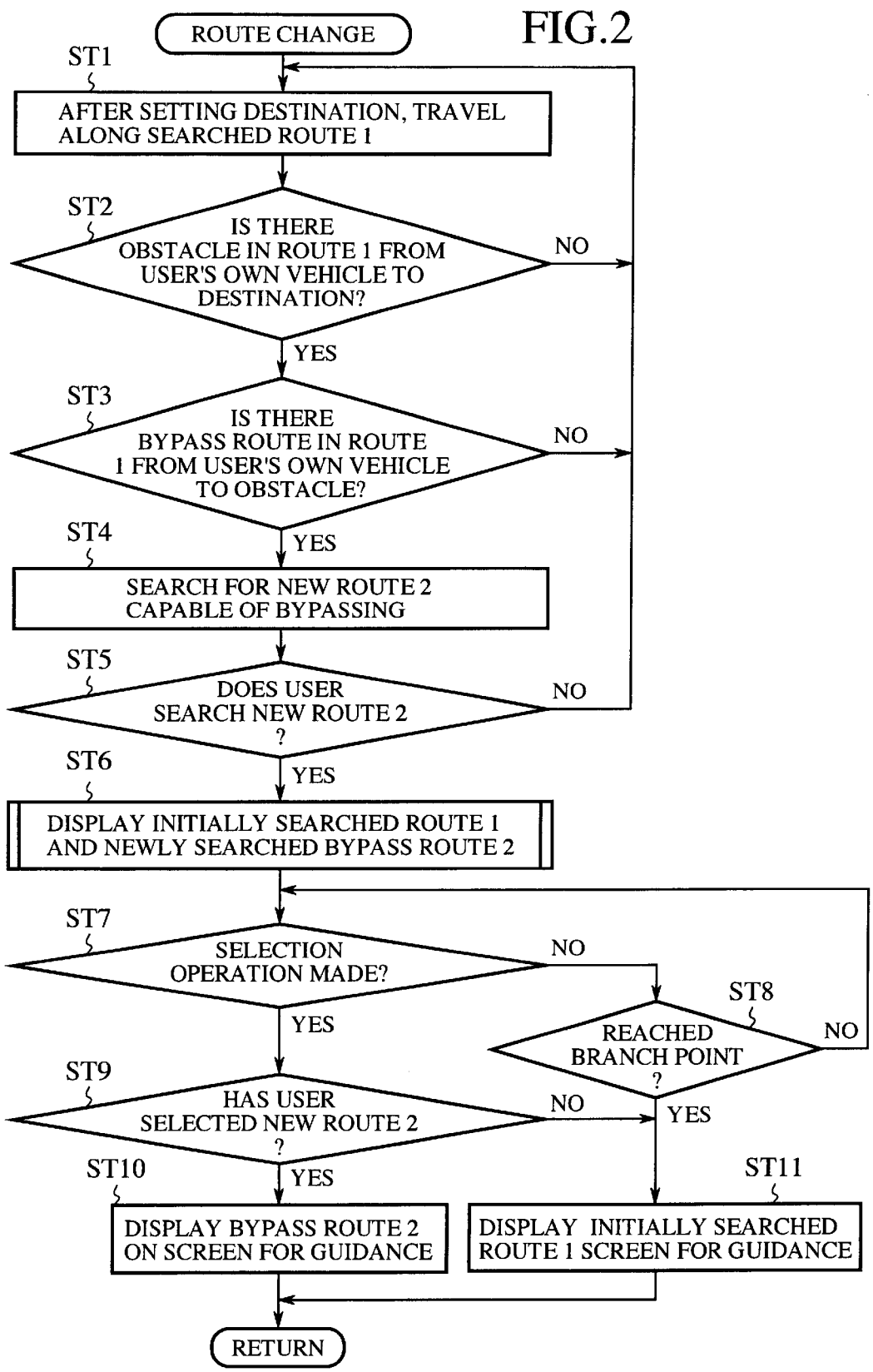
FIG. 2 is a flow chart showing a method of navigating a vehicle according to a first embodiment.

FIG. 2 is a flow chart explaining the route change in a method of navigating a vehicle executed by the control device 1. After setting the current position of the vehicle inputted by the GPS receiver 2 and the destination as well as the transit points, a processing is executed to travel along the route 1 (a first route) (step ST1). That is, the destination and the transit points are set which are inputted through the operation by the user from the operating part 6. Then, by using the map data, a destination route from the current position as the starting point to the destination via passage points is obtained by an algorithm called Dijkstra algorithm. In other words, by performing the evaluating calculation using the link lengths, kinds of roads, widths of roads, or the like, the route 1 as the route to the destination is set.

In performing the above-described setting, the control device 1 reads from the memory device 5 the data on the lower maps containing therein the starting point, the transit points, and the destination, as well as the data on the upper maps containing therein the starting point and the destination, and stores them into the RAM. Then, the routes in the lower maps of the map data stored in the RAM are set, and the routes among the lower maps are connected by using the upper maps. Among the routes from the starting point to the transit points as well as those from the transit points to the destination, the route 1 as the destination route is set, which has the highest evaluation point (i.e., has the lowest road costs). In case the set destination road is displayed on a screen of the display device 7, the marks are displayed, e.g., in a color different from those in the remaining portions at a certain interval.

In addition, in setting the destination route, by judging angle of the connection links, a flag is set with the node at which the route turns to the right or to the left as a guide intersection. As a result, the intersection at which a flag is set as seen from the current position of the vehicle becomes the guide intersection. At a predetermined position before the guide intersection, an guidance prompting the user to turn to the right or to the left is generated by the voice generating device 8.

After the route 1 has been set at step ST1 in FIG. 2, a decision is made as to whether there is an obstacle in the route 1 from the user's own vehicle to the destination (ST2). That is, the radio wave transmitted from the vehicle information and communication system (VICS) are received by the VICS receiver 9, and a detection is made by the road traffic information inputted to the control device 1 as to whether there exists in the route 1 an obstacle which may block a smooth traveling of the vehicle, such as a traffic snarl, a traffic accident, or the like. In case a detection has been made of the presence of the obstacle, a decision is made as to whether there exists a bypass route in the route 1 from the user's own vehicle to the obstacle (step ST3).

Figure 3:
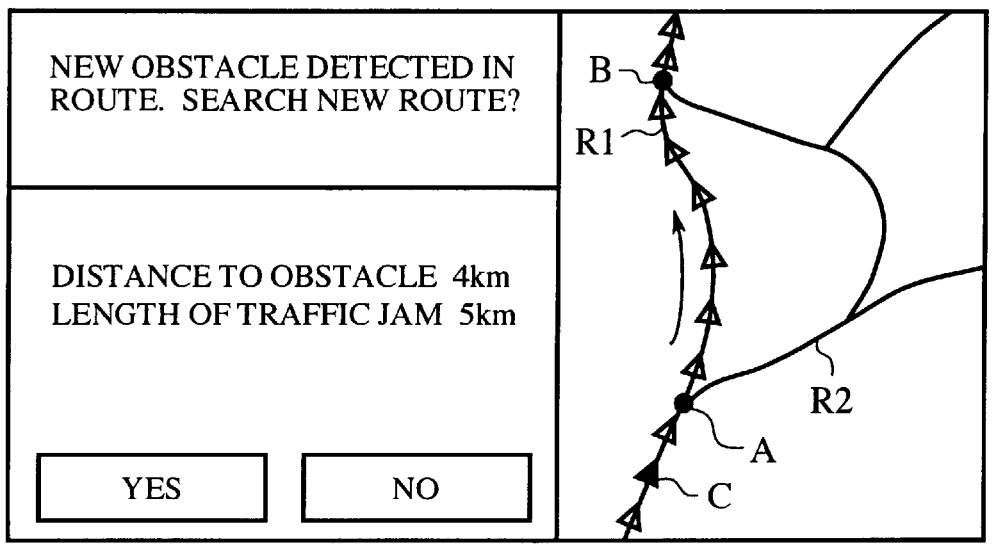
FIG. 3 is a screen showing an example of a navigation guidance according to a first embodiment.

If there exists a bypass route, a previous searching is made for the route 2 (a second route) prior to the selection by the user (step ST4). Then, as shown in FIG. 3, together with a message that an obstacle has been found, buttons are displayed on the screen of the display device 7 to prompt a user to select whether a searching will be made for the new route 2 (indicated by R2 in FIG. 3) to bypass from the branch point A to the confluence point B instead of the route 1 (indicated by R1 in FIG. 3). Further, in case a display mode where the current position of the user's own vehicle is displayed has been set, the current position C of the user's own vehicle is displayed with a mark. Then, the control device 1 judges based on the user's own selection as to whether the new route 2 will be searched for or not (step ST5).

Figure 4:
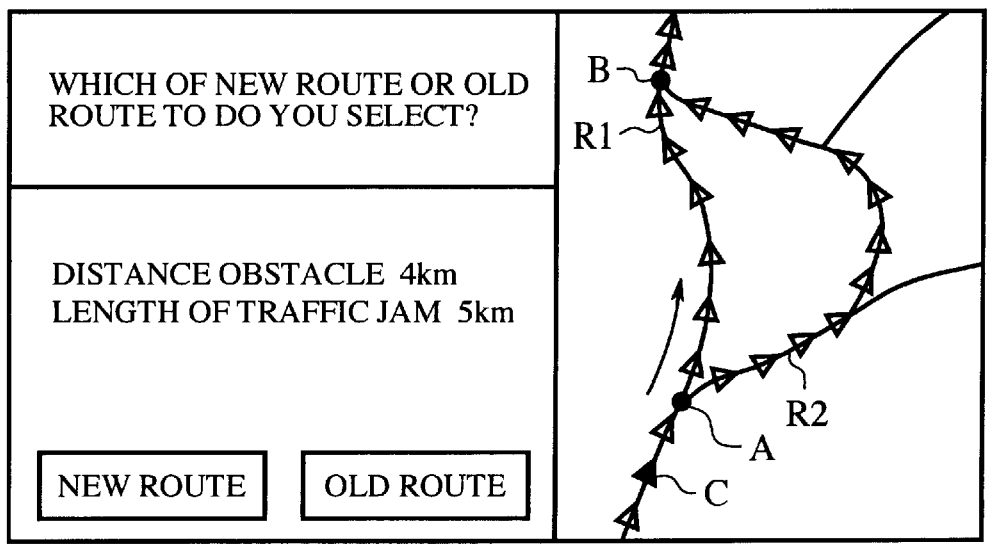
FIG. 4 is a screen showing an example of a navigation guidance transitioned from FIG. 3.

If the user has selected to search for the new route, the route 1 that is searched first and the new bypass route 2 are displayed on the screen (step ST6). That is, as shown in FIG. 4, the overall route 2 is displayed simultaneously with the presently selected route 1, and marks different in color from that in the route 1 are displayed at an interval of a predetermined distance. Further, together with the message to prompt the user to select either the new route, i.e., the route 2, or the old route, i.e., the route 1, the selection buttons are also displayed.

Then, a decision is made as to whether either the route 1 or the route 2 has been selected or not (step ST7). If the selection has not been made, a decision is made as to whether the vehicle has reached the branch point A of the route 1 and the route 2 (step ST8). If one of the routes has been selected before reaching the branch point A, a decision is made as to whether the user has selected the new route 2 or the old route 1 (step ST9).

Figure 5:
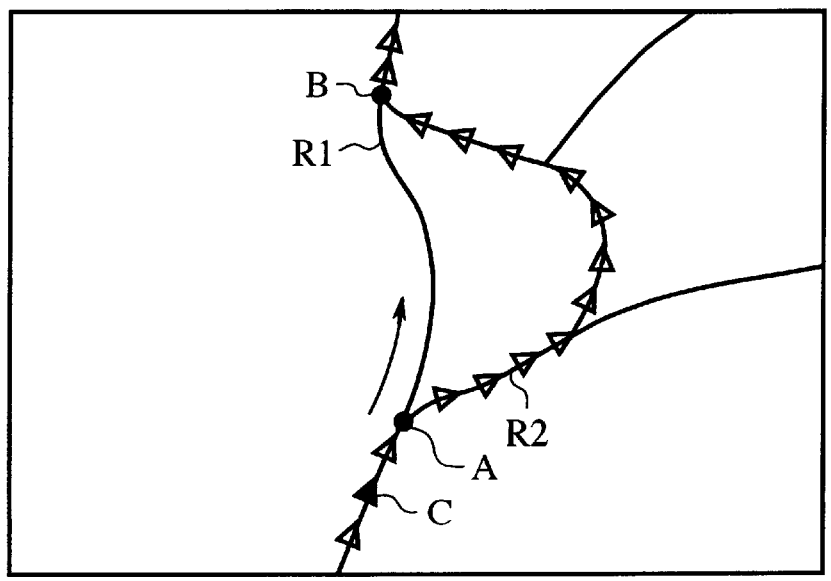
FIG. 5 is another screen showing an example of a navigation guidance transitioned from FIG. 3.

If the user has selected the route 2, the new bypass route 2 is displayed on the screen as shown in FIG. 5 for guiding (step ST10). If the user has selected the old route 1, the route 1 that is searched at the beginning is displayed on the screen for guiding (step ST11). If the user's selection is not made even after the vehicle has reached the branch point, the procedure proceeds at step ST8 to step ST11, and the route 1 that is searched at the beginning is displayed on the screen for guiding.

Figure 6:
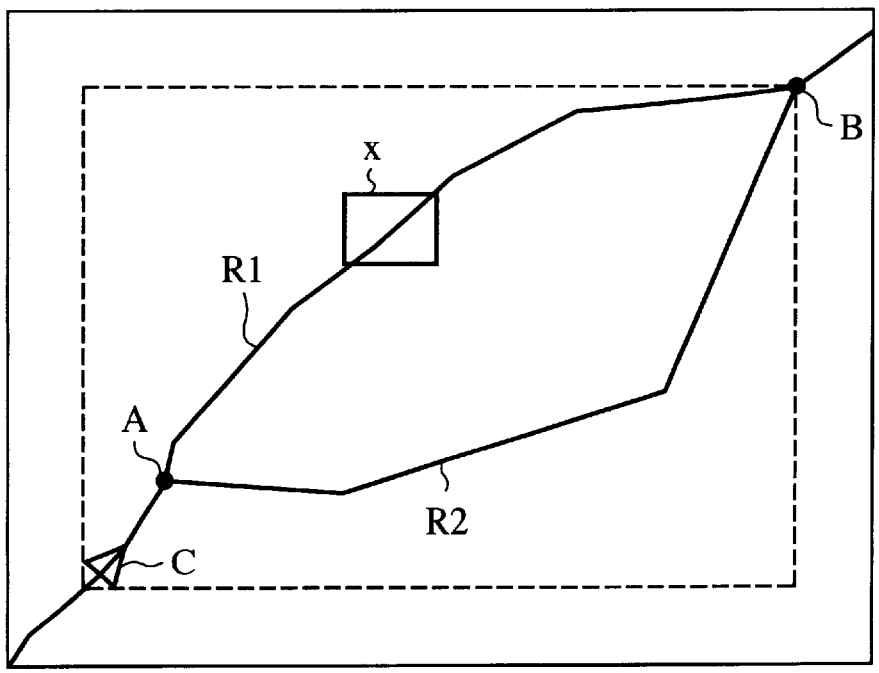
FIG. 6 is a screen showing an example of a navigation guidance of a bypass route according to a first embodiment.
Figure 7:
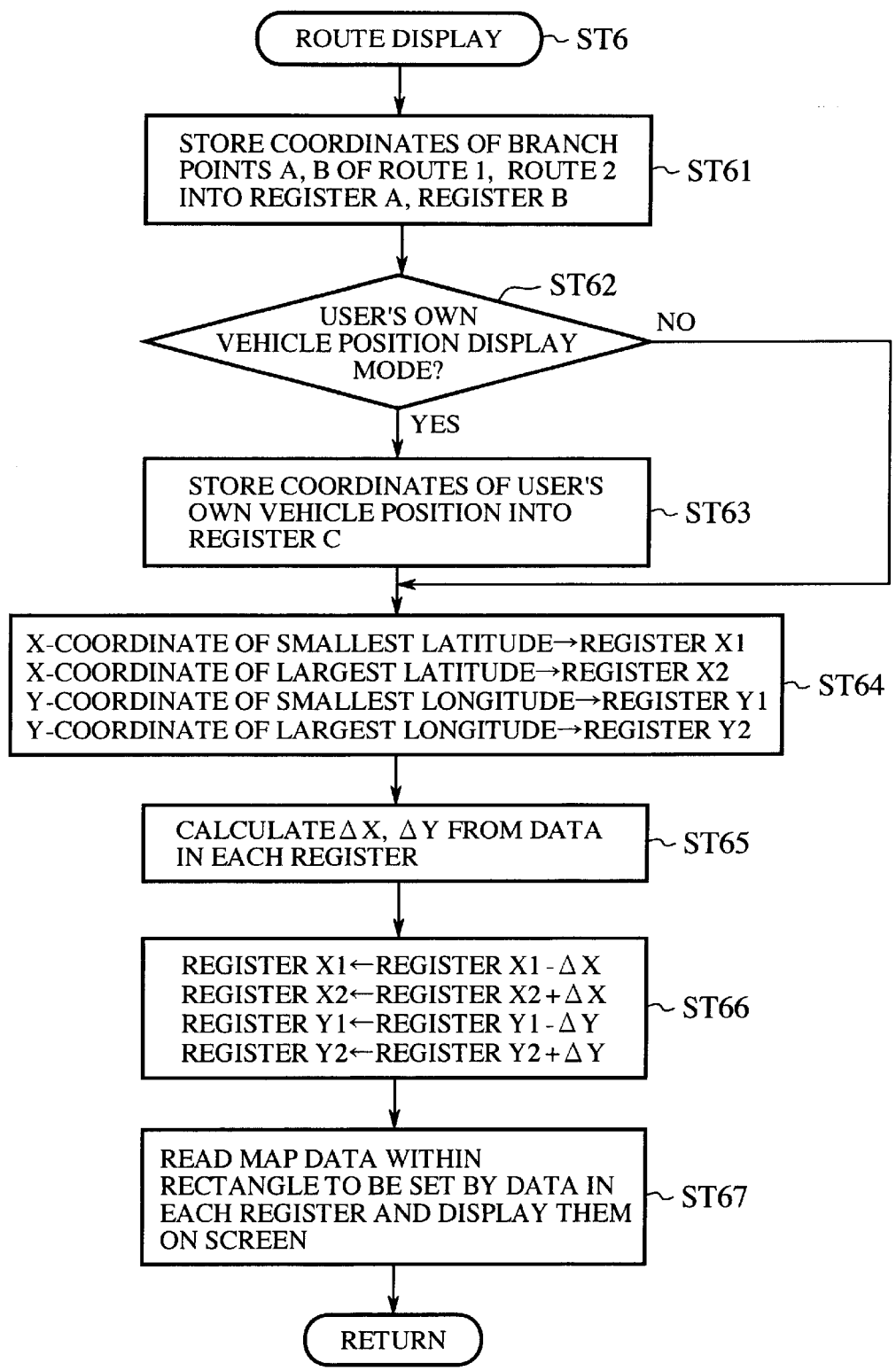
FIG. 7 is a flow chart showing the step ST6 in FIG. 2.

FIG. 6 is a screen showing route display at step ST6 in FIG. 2, and FIG. 7 is a flow chart of algorithm showing detailed operations of route display. In FIG. 6, reference character x denotes an obstacle in the route 1 (indicated by R1 in FIG. 3). The other reference characters are the same as those in FIGS. 3 through 5; i.e., reference characters A and B denote the branch point and the confluence point, respectively, of the route 1 and the route 2 (indicated by R2 in FIG. 3), and reference character C the current position of the user's own vehicle.

The operation of the route selection will be described with reference to FIG. 7. The coordinates displayed on the screen corresponding to the branch point A and the confluence point B, respectively, of the route 1 and the route 2 are stored in registers A and B of the RAM (step ST61). Then, a decision is made as to whether the mode is in a user's own vehicle position display mode or not (step ST62). Suppose that the user's own vehicle position display mode has been set at present, the coordinates of the user's own vehicle are stored in a register C (step ST63).

Then, by comparing the coordinates of the three points stored in the registers, the X-coordinate of the smallest latitude is stored in a register X1, the X-coordinate of the largest latitude in a register X2, the Y-coordinate of the smallest longitude in a register Y1, and the Y-coordinate of the largest longitude in a register Y2 (step ST64).

Then, based on the data in each of the registers, $\Delta X$ and $\Delta Y$ are calculated (step ST65). These $\Delta X$ and $\Delta Y$ are differences in the latitudinal direction and the longitudinal direction, respectively, in the map. Then, $\Delta x$ is subtracted from the coordinate of the register X1, $\Delta X$ is added to the coordinate of the register X2, $\Delta Y$ is subtracted from the coordinate of the register Y1, and $\Delta Y$ is added to the coordinate of the register Y2 (step ST66). Then, the map data within a rectangle designated by the data of each of the registers are read out and are displayed on the screen (step ST67). Thereafter, the procedure returns to the flow chart in FIG. 2.

Namely, a rectangle represented in a solid line is obtained by correcting with the differences of $\Delta X$ and $\Delta Y$ obtained by calculation from the rectangle represented in a dotted line in FIG. 6. The range calculated by this rectangle represented in solid line is the range of display on the display device 7. In this case, since the overall route 2 is displayed together with the route 1, a new display scale is set depending on how far the route 2 reaches irrespective of the initial display scale that is set by the user. The difference values of $\Delta X$ and $\Delta Y$ will also vary with the new display scale.

As is clear from the above description, according to the first embodiment, the data on the destination and the display scale is inputted in accordance with an operation. The current position of the vehicle is detected so as to set the route 1 from the current position to the destination depending on the input data on the destination and the detected current position. When an obstacle which blocks a smooth traveling of the vehicle is detected in the route 1, the route 2 to bypass the obstacle is searched for. Depending on the inputted display scale, the range of display of the map information is specified, which is displayed on the screen of the predetermined display device, and the map information to be displayed in the range of display is successively updated with the traveling of the vehicle. In case the searched route 2 is displayed, the new range of display is specified irrespective of the inputted display scale so that the overall route 2 is displayed simultaneously with the route 1. Therefore, in case the bypass route is displayed due to the occurrence of a traffic snarl, a traffic accident, or the like, in the route 1 along which the vehicle is traveling at present, the present route 1 and the bypass route 2 can be easily and accurately recognized without changing the display scale.

Further, according to the first embodiment, in case the user's own vehicle display mode has been set, the new display scale on which the overall route 2 is displayed simultaneously with the route 1 and the current position C is calculated on the basis of the branch point A and the confluence point B of the route 1 and the route 2, as well as the current position C of the vehicle. Therefore, when the bypass route 2 is displayed to bypass the route 1 along which the vehicle is traveling at present, due to the occurrence of a traffic snarl, a traffic accident, or the like, the present route 1 and the bypass route 2 can be easily and accurately recognized without changing the display scale, by displaying the route from the branch point A to the confluence point B, respectively, of the route 1 and the route 2, together with the current position C of the vehicle.

Otherwise, in case the user's own vehicle display mode has not been set, the new display scale on which the overall route 2 is displayed simultaneously with the route 1 is calculated on the basis of the branch point A and the confluence point B of the route 1 and the route 2. Therefore, when the bypass route 2 is displayed to bypass the route 1 along which the vehicle is traveling at present, due to the occurrence of a traffic snarl, a traffic accident, or the like, if the current position C of the vehicle is far from the branch point A, the route from the branch point A to the confluence point B, respectively, of the route 1 and the route 2 is displayed without changing the display scale. Thus, the present route 1 and the bypass route 2 can easily and accurately be recognized.

For this particular case, the setting of the user's own vehicle display mode may automatically be determined depending on the bypass route 2 and the distance between the current position C of the vehicle and the branch point A. Namely, in case the current position C is far from the branch point A, since there is little need of displaying the current position C, and the display portion of the bypass route 2 becomes relatively small, the user's own vehicle display mode is not set. On the other hand, in case the current position C is close to the branch point A, the user's own vehicle display mode is set. It is needless to say that this automatic setting is easily implemented by modifying part of the flow chart in FIG. 7.

Further, according to the first embodiment, after displaying the overall route 1 simultaneously with the route 1, in case neither of the route 1 and the route 2 has been selected until the current position of the vehicle reaches the branch point A of the route 1 and the route 2, the route 1 is displayed on the inputted display scale. Therefore, in case the user has selected a route, the selected route is displayed in deference to the wises of the user and, in case the user has not selected a route until the user's own vehicle reaches the branch point, the route 1 is selected as usual considering circumstances that the user has overlooked the message indicative of the selection of the bypass route, or that the user cannot afford to select the route. This does not cause the user uneasiness due to processing for the route change.

Alternatively, as another embodiment, after displaying the overall route 2 simultaneously with the route 1, in case neither of the routes has been selected during the elapse of a predetermined time of, e.g., several minutes, an arrangement may be taken such that the first route 1 is displayed on the inputted display scale. A similar effect can also be obtained in this case.

Industrial Applicability

As described above, in the navigation device for a vehicle and the method of navigating a vehicle according to the present invention is suitable for a system in which, if an obstacle such as a traffic snarl, a traffic accident, or the like, has occurred while a vehicle is traveling in an initially set route to a destination, a bypass route is searched for and the user selects either of the routes, the present route and the bypass route can easily and accurately be recognized without changing the display scale.

What is claimed is:

1. A navigation device for a vehicle comprising:
   operating means for inputting therefrom data on a destination and a display scale in accordance with operation;
   position detecting means for detecting a current position of the vehicle;
   route setting means for setting a first route from the current position to the destination based on data on the destination inputted by said operating means and the current position of the vehicle detected by said position detecting means;
   bypass route searching means for searching for a second route to bypass an obstacle when the obstacle which blocks a smooth traveling of the vehicle is detected in the first route; and
   display control means which sets the range of display of map information to be displayed on a predetermined display device in accordance with a display scale inputted by said operating means so as to successively update the map information to be displayed within the range of display with the traveling of the vehicle, said display control means also displaying the overall second route simultaneously with the first route by setting the new range of display irrespective of the inputted display scale when the second route searched by said bypass route searching means is displayed.

2. The navigation device for a vehicle according to claim 1, wherein said display control means comprises calculating means for calculating a new display scale on which the overall second route is displayed simultaneously with the first route on the basis of a branch point and a confluence point of the first route and the second route.

3. The navigation device for a vehicle according to claim 1, wherein said display control means comprises calculating means for calculating a new display scale on which the overall second route is displayed simultaneously with the first route and the current position of the vehicle on the basis of a branch point and a confluence point of the first route and the second route, and the current position of the vehicle.

4. The navigation device for a vehicle according to claim 1 wherein, after the overall second route is displayed simultaneously with the first route, when one of the routes is selected, the selected route is displayed on the inputted display scale, and wherein, after the overall second route is displayed simultaneously with the first route, when neither of the routes is selected, the first route is displayed on the inputted display scale.

5. The navigation device for a vehicle according to claim 4 wherein, after the overall second route is displayed simultaneously with the first route, when neither of the routes is selected until the current position of the vehicle reaches a branch point of the first route and the second route, the first route is displayed on the inputted display scale.

6. The navigation device for a vehicle according to claim 4 wherein, after the overall second route is displayed simultaneously with the first route, when neither of the routes is selected until a predetermined time elapses, the first route is displayed on the inputted display scale.

7. A method of navigating a vehicle comprising the steps of:
   inputting data on a destination and a display scale in accordance with an operation;
   detecting a current position of the vehicle;
   setting a first route from the current position to the destination based on data on the inputted destination and the detected current position of the vehicle;
   searching for a second route to bypass an obstacle when the obstacle which blocks a smooth traveling of the vehicle is detected in the first route; and
   successively updating the map information to be displayed within the range of display with the traveling of the vehicle by setting the range of display of map information to be displayed on a predetermined display device in accordance with the inputted display scale, and displaying the overall first route simultaneously with the second route by setting the overall second route irrespective of the inputted display scale when the searched for second route is displayed.

8. The method of navigating a vehicle according to claim 7, wherein said step of displaying further comprises a step of calculating a new display scale on which the overall second route is displayed simultaneously with the first route on the basis of a branch point and a confluence point of the first route and the second route.

9. The method of navigating a vehicle according to claim 7, wherein said step of displaying further comprises a step of calculating a new display scale on which the overall second route is displayed simultaneously with the first route and the current position of the vehicle on the basis of a branch point and a confluence point of the first route and the second route, and the current position of the vehicle.

10. The method of navigating a vehicle according to claim 7, wherein in said step of displaying, after the overall second route is displayed simultaneously with the first route, when one of the routes is selected, the selected route is displayed on an inputted display scale, and wherein, after the overall second route is displayed simultaneously with the first route, when neither of the routes is selected, the first route is displayed on the inputted display scale.

11. The method of navigating a vehicle according to claim 10, wherein in said step of displaying, after the overall second route is displayed simultaneously with the first route, when neither of the routes is selected until the current position of the vehicle reaches a branch point of the first route and the second route, the first route is displayed on the inputted display scale.

12. The method of navigating a vehicle according to claim 10, wherein in said step of displaying, after the overall second route is displayed simultaneously with the first route, when neither of the routes is selected until a predetermined time elapses, the first route is displayed on the inputted display scale.

* * * * *